(12) United States Patent
Turchi

(10) Patent No.: US 9,484,803 B2
(45) Date of Patent: Nov. 1, 2016

(54) METHOD FOR REGULATING AN OUTPUT VOLTAGE

(75) Inventor: Joel Turchi, Garonne sur Garonne (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 335 days.

(21) Appl. No.: 13/990,884

(22) PCT Filed: Dec. 24, 2010

(86) PCT No.: PCT/US2010/062105
§ 371 (c)(1),
(2), (4) Date: Aug. 19, 2013

(87) PCT Pub. No.: WO2012/087337
PCT Pub. Date: Jun. 28, 2012

(65) Prior Publication Data
US 2014/0078798 A1    Mar. 20, 2014

(51) Int. Cl.
*H02M 1/42* (2007.01)
*H02M 1/00* (2006.01)

(52) U.S. Cl.
CPC .............. *H02M 1/42* (2013.01); *H02M 1/4225* (2013.01); *H02M 2001/0032* (2013.01); *Y02B 70/126* (2013.01); *Y02B 70/16* (2013.01)

(58) Field of Classification Search
CPC ............... H02M 1/42; H02M 1/4225; H02M 2001/0032; H02M 2001/0058
See application file for complete search history.

(56) References Cited

U.S. PATENT DOCUMENTS

| | | | | |
|---|---|---|---|---|
| 4,256,983 A * | 3/1981 | Griffith | ...................... | H02P 7/29 327/101 |
| 4,473,732 A * | 9/1984 | Payne | ...................... | H05B 6/062 219/625 |
| 5,539,630 A * | 7/1996 | Pietkiewicz | ........ | H02M 3/3372 363/132 |
| 5,710,697 A * | 1/1998 | Cooke | ............... | H02M 3/33546 363/21.05 |
| 6,177,782 B1 * | 1/2001 | L'Hermite | .......... | H02M 1/4208 323/217 |
| 6,370,045 B1 * | 4/2002 | Lurkens | .................. | H02M 1/10 323/299 |
| 6,411,534 B1 * | 6/2002 | Kurnia | .................... | H02M 1/32 363/132 |
| 6,728,117 B2 * | 4/2004 | Schemmann | ....... | H02M 3/3381 363/21.12 |
| 6,828,803 B2 * | 12/2004 | Ichimasa | .............. | H05B 41/325 324/678 |
| 6,944,034 B1 * | 9/2005 | Shteynberg | ......... | H02M 1/4258 323/282 |
| 7,049,786 B1 * | 5/2006 | Toliyat | ...................... | H02P 3/18 318/254.1 |
| 7,342,365 B2 * | 3/2008 | Wu | ....................... | H02J 7/0068 315/224 |
| 7,733,672 B2 * | 6/2010 | Zhou | ..................... | H02M 3/335 323/285 |

(Continued)

FOREIGN PATENT DOCUMENTS

WO    2004107546 A1    12/2004
WO    2010082172       7/2010

OTHER PUBLICATIONS

Switched Mode Power Supply With Input-Voltage Independent Frequency Switch-Over, Research Disclosure, Mason Publications, Hampshire, GB vol. 401, Sep. 1, 1997, p. 569, XP000726756, ISN: 0374-4353.

(Continued)

*Primary Examiner* — Timothy J Dole
*Assistant Examiner* — Yusef Ahmed
(74) *Attorney, Agent, or Firm* — Rennie William Dover

(57) ABSTRACT

A method for regulating an output voltage of a converter is provided in which a switching frequency of a switching device is limited in response to a signal that is representative of a magnitude of a current from an input of the converter and to a sense signal generated in response to an input voltage signal.

14 Claims, 9 Drawing Sheets

(56) References Cited

U.S. PATENT DOCUMENTS

| | | | | |
|---|---|---|---|---|
| 8,552,679 B2* | 10/2013 | Osinga | ............... | H02J 9/005 320/101 |
| 8,723,438 B2* | 5/2014 | Melanson | ............... | 315/209 R |
| 2002/0060532 A1* | 5/2002 | Weber | ............... | H04N 3/16 315/364 |
| 2003/0128555 A1* | 7/2003 | Schemmann | ....... | H02M 3/3385 363/16 |
| 2003/0142513 A1* | 7/2003 | Vinciarelli | ............... | H02J 1/102 363/17 |
| 2004/0257056 A1* | 12/2004 | Huang | ............... | H02M 3/1588 323/282 |
| 2005/0007088 A1* | 1/2005 | Yang | ............... | H02M 1/4225 323/283 |
| 2006/0043951 A1* | 3/2006 | Oswald | ............... | H02M 3/156 323/282 |
| 2006/0049815 A1* | 3/2006 | Ho | ............... | H02M 3/158 323/282 |
| 2006/0203814 A1* | 9/2006 | Ye | ............... | H02M 3/156 370/373 |
| 2009/0295531 A1* | 12/2009 | Silva | ............... | H01F 3/10 336/221 |
| 2009/0302814 A1* | 12/2009 | Kapels | ............... | H02M 3/1588 323/282 |
| 2010/0033136 A1* | 2/2010 | Yang | ............... | H02J 7/0072 320/140 |
| 2011/0109283 A1* | 5/2011 | Kapels | ............... | H02M 3/1588 323/282 |
| 2012/0105034 A1* | 5/2012 | Brown | ............... | H02M 1/38 323/282 |
| 2013/0038301 A1* | 2/2013 | Ouyang | ............... | H02M 3/156 323/271 |
| 2013/0038310 A1* | 2/2013 | Menegoli | ............... | H02M 3/156 323/288 |
| 2013/0043850 A1* | 2/2013 | Zhu | ............... | H02M 3/156 323/271 |
| 2013/0069611 A1* | 3/2013 | Menegoli | ............... | H02M 3/1584 323/284 |
| 2013/0127353 A1* | 5/2013 | Athalye | ............... | H05B 33/0815 315/193 |
| 2013/0141069 A1* | 6/2013 | Li | ............... | G05F 1/575 323/283 |
| 2014/0049240 A1* | 2/2014 | Chen | ............... | G05F 1/10 323/282 |
| 2014/0062433 A1* | 3/2014 | Zhou | ............... | H02M 3/158 323/271 |
| 2014/0070776 A1* | 3/2014 | Hsu | ............... | G05F 1/10 323/271 |
| 2015/0048807 A1* | 2/2015 | Fan | ............... | H02M 1/4225 323/208 |

OTHER PUBLICATIONS

Frequency Foldback Current Mode PWM Controller, Data Sheet for UCC2884 and UCC3884 from Texas Instruments, SLUS160C-Aug. 1999-Nov. 2008, pp. 1-12. www.ti.com.

The UCC3884 Frequency Foldback Pulse Width Modulator, Philip Cooke, Application Note U-164 from Unitrode Corporation, 1999, pp. 1-17.

Single Ended PWM Controller Featuring QR Operation and Soft Frequency Foldback, Data Sheet for NCP1205 from Semiconductor Components Industries, pp. 1-17, Publication Order No. NCP1205/D, Rev. 9, Jul. 2009. www.onsemi.com.

Fixed Frequency Current Mode Controller for Flyback Converters, Data Sheet for NCP1237 from Semiconductor Components Industries, pp. 1-41, Publication Order No. NCP1237/D, Rev. 2, May 2010. www.onsemi.com.

A 75 W TV Power Supply Operating in Quasi-square Wave Resonant Mode using the NCP1207 Controller, Nicolas Cyr, Application Note AND8145/D from Semiconductor Components Industries, pp. 1-22, Publication Order No. AND8145/D, Rev. 0, Mar. 2004. www.onsemi.com.

Power Factor Correction Stages Operating in Critical Conduction Mode, Joel Turchi, Application Note AND8123/D from Semiconductor Components Industries, pp. 1-20, Publication Order No. AND8123/D, Rev. 1, Sep. 2003. www.onsemi.com.

* cited by examiner

METHOD FOR REGULATING AN OUTPUT VOLTAGE

BACKGROUND

The present invention relates, in general, to electronics and, more particularly, to methods of forming semiconductor devices and structure.

Power converter circuits are typically used within power supply applications and may include DC to DC converters, AC to DC converters, DC to AC converters, and AC to AC converters. These types of circuits may include rectification elements, energy storage elements, switching elements, etc. For example, in ac/dc rectification applications, a converter system may include a full wave voltage rectifier, typically in the form of a diode bridge and a main Switch Mode Power Supply ("SMPS") to provide regulation of the output waveform. PFC circuits are inserted between the line and the main SMPS to draw a sinusoidal current from the line and to provide Direct Current ("DC") voltage to the main SMPS. A drawback with PFC circuits is that their performance is degraded under a light or low load condition because of large switching losses from a switching transistor, an inductor, or other switching elements. A system that improves the efficiency of the PFC circuit at a low load is disclosed in International Patent Application No. PCT/IB2010/050154 to NXP B.V. having Publication No. WO2010/082172A1 and publication date of Jul. 22, 2010.

Other types of converter circuits having large switching losses include flyback converters, forward converters, etc.

Accordingly, it would be advantageous to have a method and circuit suitable for use as a converter that mitigates switching losses. It would be of further advantage for the method and structure to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
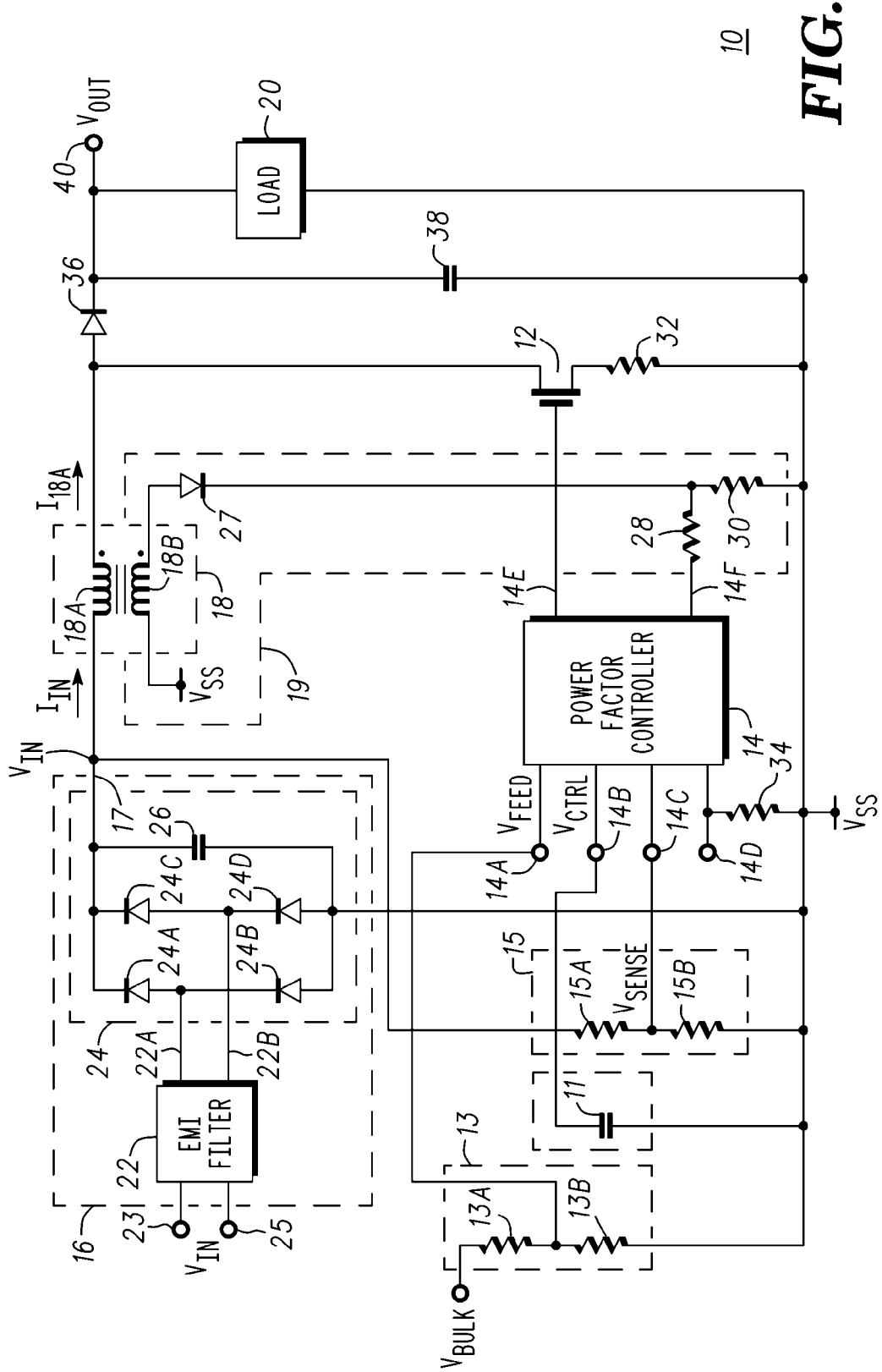
FIG. 1 is a circuit schematic of a converter that includes a power factor controller in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor. Although the devices are explained herein as certain N-channel or P-channel devices, or certain N-type or P-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. The use of the word approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Translator-Translator Logic (TTL) system a logic low voltage level may be about 0.8 volts, whereas for a five volt CMOS system, the logic zero voltage level may be about 1.5 volts. A logic one voltage level ($V_H$) is also referred to as a logic high voltage level and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally the present invention provides a power factor controller and a method for mitigating switching losses in a converter circuit. In accordance with an embodiment of the present invention, a power factor controller includes a regulator stage, a control stage, and an output stage. The regulator stage generates a regulated electrical signal $V_{REGUL}$ that is transmitted to an input of the output stage and the control stage generates a clock signal $V_{CLK}$ that is transmitted to another input of the output stage. In response to signals $V_{REGUL}$ and $V_{CLK}$, the output stage generates a drive signal $V_{DRV}$ suitable for driving a switching transistor under light, medium, and heavy loads that mitigates switching losses of the switching transistor.

In accordance with another embodiment of the present invention, a method for operating the power factor controller and converter is provided. In response to a high input current, a converter 10 operates in critical conduction mode or in a quasi-resonant (QR) mode, and in response to the input current being low, i.e., in a light load condition, or near the zero crossing, converter 10 operates in a frequency fold-back mode and a delay or dead-time is introduced before the start of the next current cycle, wherein the delay is set by a timer in accordance with a magnitude of the input current and controls the dead time rather than the switching period or the total off time. Hence variations in the current cycle duration do not affect the dead time.

In accordance with other embodiments of the present invention and in response to operating in the frequency fold-back mode, the next current cycle, i.e., the next gate drive signal, is started in response to a falling edge of the drain-to-source voltage $V_{DS}$ of the switching transistor. More particularly, the next current cycle is started in response to a falling edge of an oscillatory portion of the drain-to-source voltage $V_{DS}$, thus the gate drive signal is synchronized to the drain-to-source voltage $V_{DS}$, and more particularly to a valley of the drain-to-source voltage $V_{DS}$. It should be noted that at the end of an oscillator period the drain-to-source voltage of the switching transistor may not be at a valley, but can be at a higher voltage. Synchronizing the start of the gate drive signal to the valley reduces the switching losses.

In accordance with other embodiments of the present invention, in which the input current is very small, the converter can enter a skip mode in which the skipping is synchronized to the input current and skips at the line zero crossing.

In accordance with other embodiments of the present invention and in response to operating in the frequency fold-back operating mode, a delay or dead-time is introduced before the start of the next current cycle, which is started in response to a valley of the drain-to-source voltage $V_{DS}$. It should be noted that the delay is set by a timer in accordance with a magnitude of the input current.

FIG. 1 is a block diagram of a converter 10 in accordance with an embodiment of the present invention. Converter 10 includes a switching device 12 having a control electrode configured to receive a drive signal ($V_{DR}$) from a power factor controller 14 and a current carrying electrode coupled to an input stage 16 through an inductor 18A and coupled to a load 20 through a diode 36. Power factor controller 14 may be referred to as a drive stage, a driver stage, or a drive circuit. More particularly, switching device 12 may be a power Field Effect Transistor (FET) having a drain electrode, a source electrode, and a gate electrode. Input stage 16 may be comprised of an Electromagnetic Interference (EMI) filter connected to a rectifier circuit 24, comprising diodes 24A, 24B, 24C, and 24D. Input terminals 23 and 25 of EMI filter 22 may be coupled for receiving an AC line signal. The anodes of diodes 24B and 24D are commonly connected together and for receiving a source of operating potential such as for example a potential $V_{SS}$. The cathode of diode 24B is commonly connected to an output terminal 22A of EMI filter 22 and to the anode of diode 24A and the cathode of diode 24D is commonly connected to an output terminal 22B of EMI filter 22 and to the anode of diode 24C. The cathodes of diodes 24A and 24C are commonly connected together and serve as an output 17 of input stage 16. A capacitor 26 is coupled between output 17 and the commonly connected anodes of diodes 24B and 24D.

Inductor 18A is magnetically coupled to an inductor 18B to form a magnetic element 18. Inductor 18A has a terminal connected to output 17 of input stage 16 and a terminal connected to the drain electrode of power FET 12. Inductor 18B has a terminal coupled for receiving a source of operating potential such as, for example, operating potential $V_{SS}$ and a terminal connected to an input pin 14F of power factor controller 14 through a diode 27 and a resistor 28. The voltage across inductor or winding 18B is representative of the inductor phase, i.e., charging, demagnetization, or dead-time phase. More particularly, the terminal of inductor 18B is connected to the anode of diode 27 and the cathode of diode 27 is commonly connected to terminals of resistors 28 and 30. The other terminal of resistor 28 is connected to input pin 14F of power factor controller 14 and the other terminal of resistor 30 is coupled for receiving source of operating potential $V_{SS}$. Inductor 18B, diode 27, and resistors 28 and 30 cooperate to form a zero current detection circuit 19. Alternatively, a resistor can be inserted between inductor 18A and input pin 14F. It should be noted that the method for performing zero current detection is not limited to magnetically coupling two inductors together and coupling a diode and a pair of resistors to one of the inductors. For example, zero current detection may be accomplished by inserting a single resistor between the node common to the anodes of diodes 24B and 24D and the terminal of capacitor 26 and source of operating potential $V_{SS}$, and detecting zero current through the resistor.

The gate electrode of power FET 12 is connected to output terminal 14E of power factor controller 14 and the source electrode of power FET 12 is coupled for receiving source of operating potential $V_{SS}$ through a resistor 32.

An input/output terminal 14D of power factor controller 14 is coupled for receiving source of operating potential $V_{SS}$ through a resistor 34. In addition, power factor controller 14 has input terminals 14A, 14B, and 14C which are further described with reference to FIG. 11. Input 14A may be coupled to a resistor divider network 13 that comprises resistors 13A and 13B, where a terminal of resistor 13A and a terminal of resistor 13B are commonly connected to input terminal 14A, the other terminal of resistor 13A is coupled for receiving the potential at node 40, i.e., potential $V_{OUT}$ of the power factor correction stage, and the other terminal of resistor 13B is coupled for receiving a source of operating potential such as, for example, potential $V_{SS}$. Input 14C may be coupled to a resistor divider network 15 that comprises resistors 15A and 15B, where a terminal of resistor 15A and a terminal of resistor 15B are commonly connected to input terminal 14C, the other terminal of resistor 15A is coupled for receiving an input signal $V_{IN}$, and the other terminal of resistor 15B is coupled for receiving a source of operating potential such as, for example, potential $V_{SS}$. A capacitor 11 has a terminal connected to input terminal 14B and the other terminal of capacitor 11 is coupled for receiving a source of operating potential such as, for example, potential $V_{SS}$.

The drain terminal of power FET 12 is connected to an anode of diode 36. A capacitor 38 is connected between the cathode of diode 36 and source of operating potential $V_{SS}$ and load 20 is connected between the cathode of diode 36 and source of operating potential $V_{SS}$. It should be noted that the commonly connected terminals of capacitor 38 and load 20 and the cathode of diode 36 may form an output node 40 at which an output signal $V_{OUT}$ appears.

In operation, converter 10 receives an input signal at inputs 23 and 25, rectifies the input signal and, in response to the switching activity of switching transistor 12 and the rectified input signal, generates an input current $I_{IN}$. It should be noted that input current $I_{IN}$ is an average value of inductor current $I_{18A}$ over a switching period. As the load becomes lighter, the switching losses of switching transistor 12 degrade the efficiency of converter 10. Converter 10 is configured to operate in a Current Controlled Frequency Fold-back (CCFF) fashion, where converter 10 operates in Critical Conduction Mode (CrM) in response to a large current drawn from the line and in frequency fold-back mode in response to a lighter current or less current drawn from the line. The large current is referred to as a heavy current or heavy input current and the lighter current is referred to as a light current or a light input current.

Figure 2:
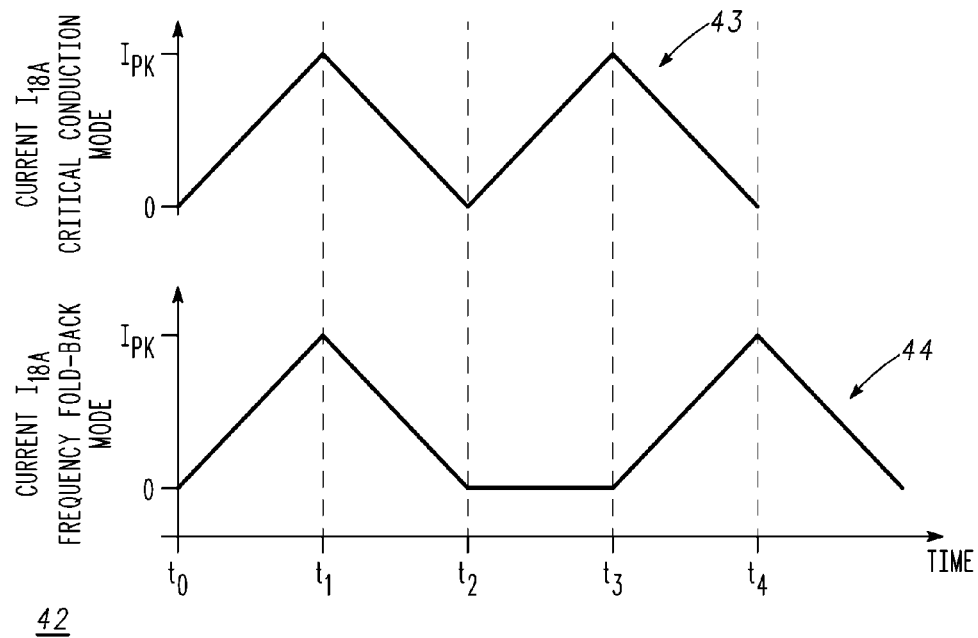
FIG. 2 is a plot of inductor current versus time for the converter of FIG. 1 in accordance with an embodiment of the present invention.

FIG. 2 is a timing diagram 42 of inductor current $I_{18A}$ in response to a critical conduction mode operation (plot 43 of timing diagram 42) and frequency fold-back mode of operation (plot 44 of timing diagram 42). What is shown in FIG. 2 is a timing diagram or plot 43 of the inductor current, $I_{18A}$, for a converter 10 operating in the critical current conduction mode, i.e., under a heavy input current, and a timing diagram or plot 44 in response to converter 10 operating in the frequency fold-back mode of operation, i.e., under medium or light input current. In the critical conduction mode shown in timing diagram 43, inductor current $I_{18S}$ increases linearly from time $t_0$ to time $t_1$ in response to a drive signal $V_{DR}$ at the gate of switching transistor 12 (shown in FIG. 1) being at a logic high voltage level, i.e., switching transistor 12 is on. Inductor current $I_{18A}$ transitions from a zero current level at time $t_0$ to a peak current level $I_{pk}$ at time $t_1$. In response to switching transistor 12 turning off at time $t_1$, inductor current $I_{18A}$ decreases linearly from peak current level $I_{pk}$ at time $t_1$ to zero at time $t_2$. At time $t_2$, inductor current $I_{18A}$ is substantially zero and the next current cycle begins. The time from time $t_0$ to time $t_1$ is referred to as the on-time $t_{on}$ because switching transistor 12 is "on" and the time from time $t_1$ to time $t_2$ may be referred to as the off time $t_{off}$ because switching transistor 12 is "off."

In response to a light input current or a medium input current condition, converter 10 operates in a frequency fold-back mode. Inductor current $I_{18A}$ for the frequency fold-back mode is illustrated in timing diagram 44. In accordance with the frequency fold-back operating mode, inductor current $I_{18A}$ increases linearly from zero at time $t_0$ to peak current $I_{pk}$ at time $t_1$ in response to drive signal $V_{DR}$ at the gate of switching transistor 12. In response to switching transistor 12 turning off at time $t_1$, inductor current $I_{18A}$ decreases linearly from current level $I_{pk}$ at time $t_1$ to zero at time $t_2$. In response to a control signal from power factor controller 14, switching transistor 12 remains off from time $t_2$ to time $t_3$. The time from time $t_0$ to time $t_1$ may be referred to as the on-time $t_{on}$ because switching transistor 12 is on; the time from time $t_1$ to time $t_2$ may be referred to as the off time $t_{off}$ because switching transistor 12 is off but inductor current $I_{18A}$ is flowing; and the time from time $t_2$ to time $t_3$ may referred to as the dead-time because switching transistor 12 is off and inductor current $I_{18A}$ is zero. At time $t_3$, power controller 14 generates a drive signal $V_{DR}$ that turns on switching transistor 12 thereby restarting the on-time $t_{on}$.

Figure 3:
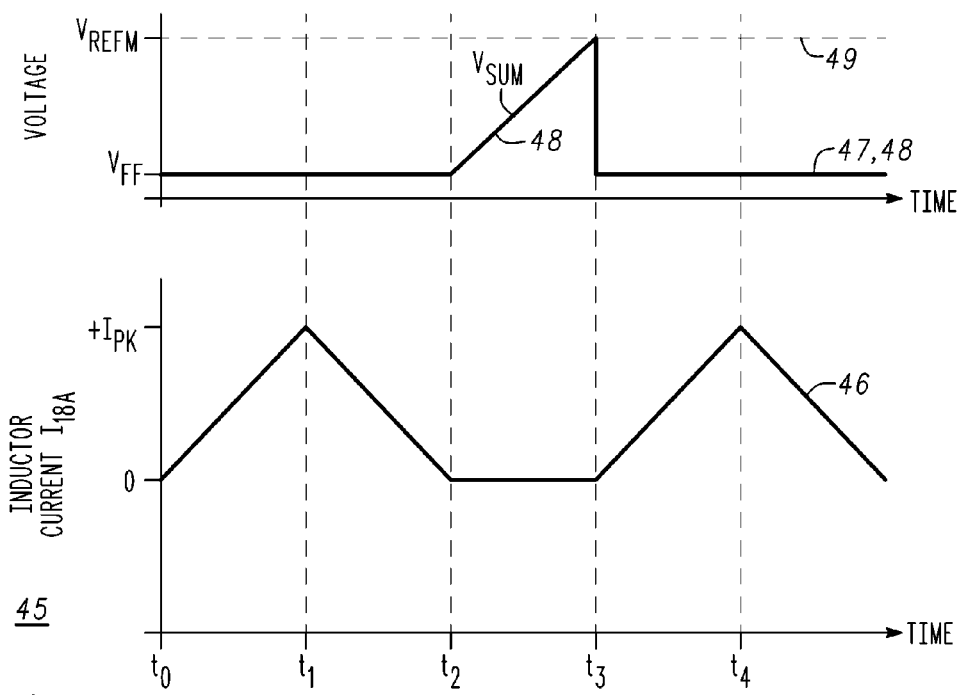
FIG. 3 is a timing diagram of circuit parameters of the converter of FIG. 1 in accordance with an embodiment of the present invention.

FIG. 3 is a timing diagram 45 that further illustrates signals used by converter 10 to generate drive signal $V_{DR}$ which may turn on power transistor 12. What is shown in FIG. 3 is a plot 46 of inductor current $I_{18A}$ over a time period from time $t_0$ to time $t_4$. Inductor current $I_{18A}$ over this time period has been described with reference to FIG. 2. In addition, FIG. 3 illustrates a current information signal $V_{FF}$ that is a signal value representative of the power at the input of converter 10. By way of example, information signal $V_{FF}$ is a voltage representative of input current $I_{IN}$. FIG. 3 also illustrates a preset reference voltage $V_{REFM}$ that is a user defined value. In response to current information signal $V_{FF}$ being greater than preset reference voltage $V_{REFM}$, converter 10 operates in a critical conduction mode and in response to current information signal $V_{FF}$ being less than preset reference voltage $V_{REFM}$, converter 10 operates in a frequency fold-back mode. Accordingly, FIG. 3 illustrates operation in the frequency fold-back mode. It should be noted that current information signal $V_{FF}$ is generated by coupling resistor 34 (shown in FIG. 1) to input/output terminal 14D of power factor controller 14 and injecting a current representative of input current $I_{IN}$ into resistor 34. Alternatively, current $I_{IN}$ can be directly sensed and used to develop current information signal $V_{FF}$. Restart signal $V_{SUM}$ is developed internally by power factor controller 14 and is the sum of current information signal $V_{FF}$ and a ramp signal generated by an output stage 100 of power factor controller 14. Output stage 100 is described with reference to FIG. 11. Between times $t_0$ and $t_2$, the ramp signal is zero, thus current information signal $V_{FF}$ and restart signal $V_{SUM}$ are substantially the same as indicated by plots 47 and 48. At time $t_2$, output stage 100 generates a ramp signal that is summed with or added to current information voltage $V_{FF}$. Thus, restart signal $V_{SUM}$ increases during the time period from time $t_2$ to time $t_3$. At time $t_3$, restart signal $V_{SUM}$ substantially equals preset reference signal $V_{REFM}$. In response to start signal $V_{SUM}$ being substantially equal to preset reference signal $V_{REFM}$, power factor controller 14 generates a drive signal $V_{DR}$ that turns on switching transistor 12. Accordingly, at time $t_3$, inductor current $I_{18A}$ begins to increase.

Figure 4:
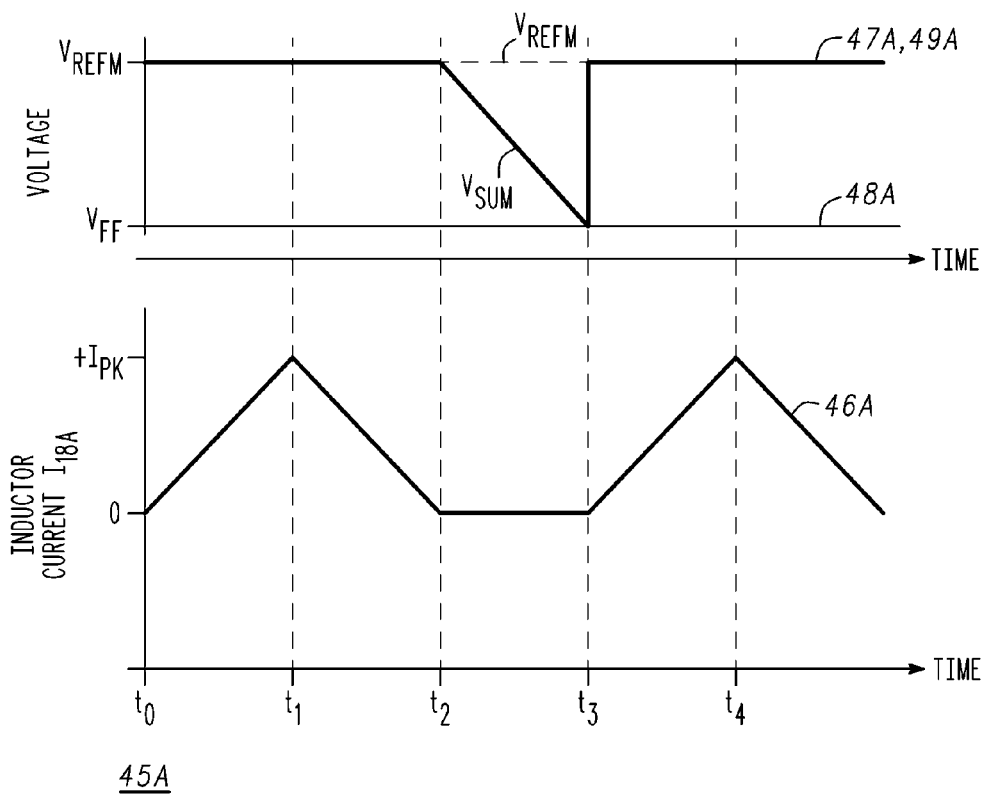
FIG. 4 is a timing diagram of circuit parameters of the converter of FIG. 1 in accordance with an embodiment of the present invention.

FIG. 4 is a timing diagram 45A that further illustrates signals used by converter 10 to generate drive signal $V_{DR}$ which may turn on power transistor 12. Timing diagram 45A is similar to timing diagram 45 except that it illustrates an embodiment in which the ramp generated by output stage 100 has a negative slope. Like in timing diagram 45, restart signal $V_{SUM}$ is developed internally by power factor controller 14 but it is the difference between preset reference voltage $V_{REFM}$ and a ramp signal generated by an output stage 100 of power factor controller 14. Between times $t_0$ and $t_2$, the ramp signal is zero and preset reference voltage $V_{REFM}$ is substantially equal to restart signal $V_{SUM}$ as indicated by plots 47A and 49A. At time $t_2$, output stage 100 generates a ramp signal that is subtracted from preset reference voltage $V_{REFM}$. Thus, restart signal $V_{SUM}$ decreases during the time period from time $t_2$ to time $t_3$. At time $t_3$, restart signal $V_{SUM}$ substantially equals current information signal $V_{FF}$. In response to start signal $V_{SUM}$ being substantially equal to current information signal $V_{FF}$, power factor controller 14 generates a drive signal $V_{DR}$ that turns on switching transistor 12. Accordingly, at time $t_3$, inductor current $I_{18A}$ begins to increase.

Figure 5:
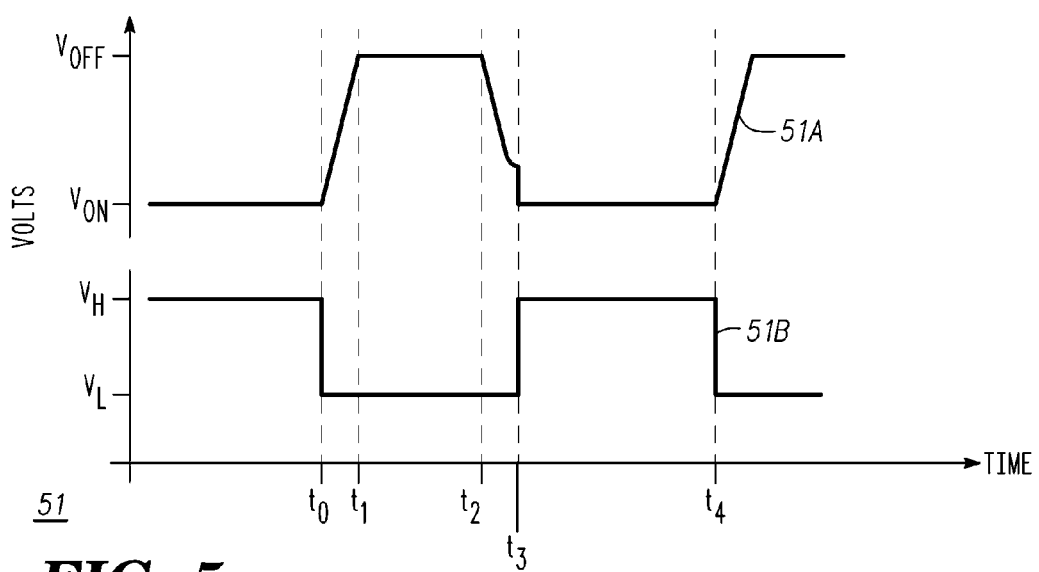
FIG. 5 is a timing diagram of circuit parameters of the converter of FIG. 1 in accordance with an embodiment of the present invention.

FIG. 5 is a timing diagram 51 that illustrates drain-to-source voltage $V_{DS}$ of switching transistor 12 operating in critical conduction mode in response to switching transistor 12 turning off and turning on. More particularly, timing diagram 51 includes a plot 51A illustrating drain-to-source voltage $V_{DS}$ in response to a gate drive signal shown in plot 51B. At time $t_0$, the gate drive signal transitions from a logic high voltage level ($V_H$) to a logic low voltage level ($V_L$). In response to the gate drive signal transitioning to logic low voltage level $V_L$, drain-to-source voltage $V_{DS}$ begins to transition from voltage level $V_{ON}$ to voltage level $V_{OFF}$. At time $t_1$, drain-to-source voltage $V_{DS}$ reaches voltage level $V_{OFF}$. At time $t_2$, drain-to-source voltage $V_{DS}$ begins to decrease in response to leakage currents discharging the parasitic drain-to-source capacitance of switching transistor 12. It should be noted that at time $t_2$, inductor current $I_{18A}$ is substantially zero. (See time $t_2$ in plot 43 of FIG. 2). However, there may be a delay in asserting the gate drive voltage so that the drain-to-source voltage $V_{DS}$ is at a valley, i.e., becomes a minimum, to reduce switching losses. At time $t_3$, the gate drive signal transitions from logic low voltage level $V_L$ to logic high voltage level $V_H$, which turns on switching transistor 12. As discussed with reference to time $t_2$, there may be a delay before the gate drive signal is asserted. This delay occurs between times time $t_2$ and time $t_3$. At time $t_4$, the gate drive signal transitions from logic high voltage level $V_H$ to logic low voltage level $V_L$ which turns off switching transistor 12. In response to switching transistor 12 being off, drain-to-source voltage $V_{DS}$ transitions to voltage level $V_{OFF}$. Because converter 10 is operating in the critical conduction mode, there is no delay in generating the gate drive signal.

Figure 6:
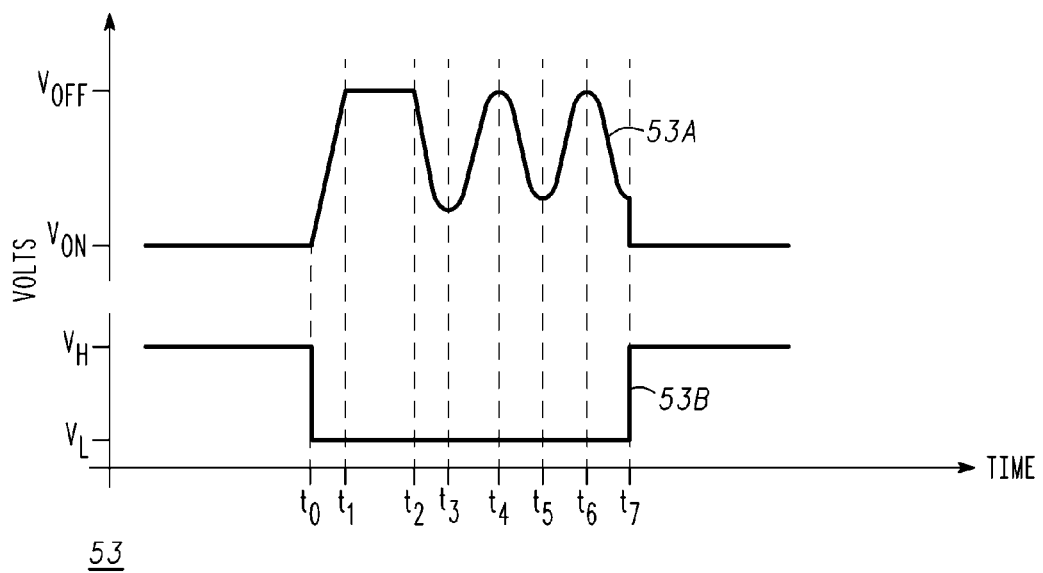
FIG. 6 is a timing diagram of circuit parameters of the converter of FIG. 1 in accordance with an embodiment of the present invention.

FIG. 6 is a timing diagram 53 that illustrates drain-to-source voltage $V_{DS}$ of switching transistor 12 in frequency fold-back mode in response to switching transistor 12 turning off and turning on. The boost stage for the converter 10 having timing diagram 53 is operating in a controlled frequency discontinuous operating mode. More particularly, timing diagram 53 includes a plot 53A illustrating drain-to-source voltage $V_{DS}$ in response to a gate drive signal shown in plot 53B. At time $t_0$, the gate drive signal transitions from logic high voltage level $V_H$ to logic low voltage level $V_L$. In response to the gate drive signal transitioning to logic low voltage level $V_L$, drain-to-source voltage $V_{DS}$ transitions from voltage level $V_{ON}$ to voltage level $V_{OFF}$. At time $t_1$, drain-to-source voltage signal $V_{DS}$ reaches voltage level $V_{OFF}$. At time $t_2$, drain-to-source voltage $V_{DS}$ begins to oscillate. The oscillation results from a tank circuit formed by inductor 18A and the parasitic capacitances attached to the drain of switching transistor 12 and the capacitance associated with diode 36. The drain-to-source voltage $V_{DS}$ continues to oscillate between times $t_2$ and $t_7$, wherein voltage $V_{DS}$ has relative minima at times $t_3$, $t_5$, and $t_7$ and relative maxima at times $t_4$ and $t_6$. The relative voltage minima at times $t_3$, $t_5$, and $t_7$ are referred to as valleys and the time period between times $t_2$ and $t_7$ is referred to as a delay period. As will be discussed below, in accordance with embodiments of the present invention, the gate drive signal transitions from logic low voltage level $V_L$ to logic high voltage level $V_H$ after a last falling edge of drain-to-source voltage $V_{DS}$ during the delay period. At time $t_7$, the gate drive signal transitions from logic low voltage level $V_L$ to logic high voltage level $V_H$, which turns on switching transistor 12. Because converter 10 is operating in the frequency fold-back mode, power factor controller 14 delays the transition of the gate drive signal from logic low voltage level $V_L$ to logic high voltage level $V_H$ in accordance with inductor current $I_{18A}$ and whether drain-to-source voltage $V_{DS}$ is at a valley.

Figure 7:
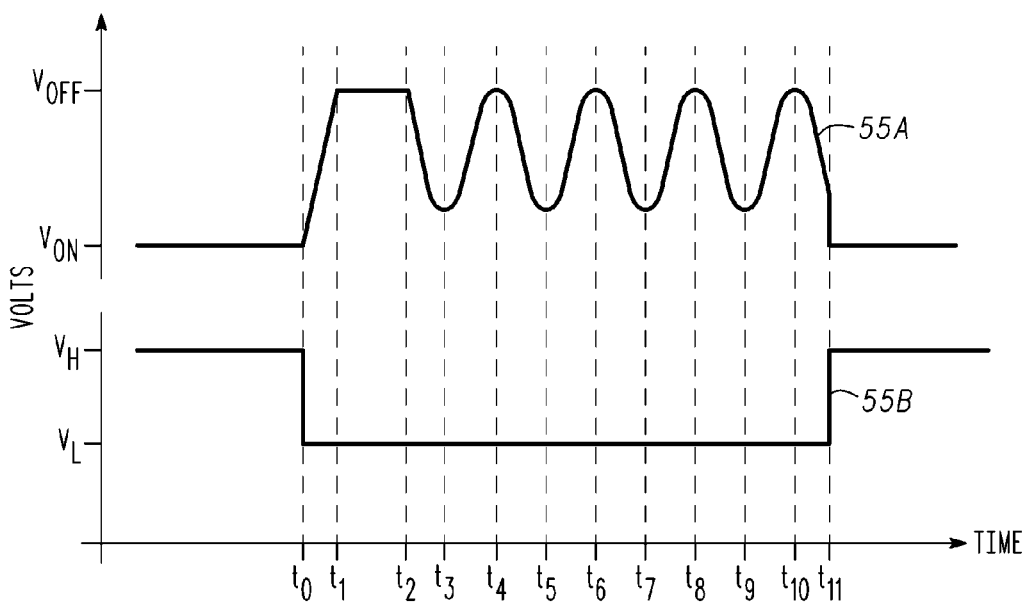
FIG. 7 is a timing diagram of circuit parameters of the converter of FIG. 1 in accordance with an embodiment of the present invention.

FIG. 7 is a timing diagram 55 that illustrates drain-to-source voltage $V_{DS}$ of switching transistor 12 in frequency fold-back mode in response to switching transistor 12 turning off and turning on. Input current $I_{IN}$ for the drain-to-source voltage $V_{DS}$ shown in timing diagram 55 of FIG. 7 is lower than input current $I_{IN}$ for drain-to-source voltage $V_{DS}$ shown in timing diagram 53 of FIG. 6. Like timing diagram 53, the boost stage for the converter 10 having timing diagram 55 is operating in a controlled frequency discontinuous operating mode. Timing diagram 55 includes a plot 55A illustrating drain-to-source voltage $V_{DS}$ in response to a gate drive signal shown in plot 55B. At time $t_0$, the gate drive signal transitions from logic high voltage level $V_H$ to logic low voltage level $V_L$. In response to the gate drive signal transitioning to logic low voltage level $V_L$, drain-to-source voltage $V_{DS}$ transitions from voltage level $V_{ON}$ to voltage level $V_{OFF}$. At time $t_1$, drain-to-source voltage signal $V_{DS}$ reaches voltage level $V_{OFF}$. At time $t_2$, drain-to-source voltage $V_{DS}$ begins to oscillate because of the tank circuit formed by inductor 18A and the parasitic capacitances associated with the drain of switching transistor 12 and with diode 36. The drain-to-source voltage $V_{DS}$ continues to oscillate during the time period from time $t_3$ to time $t_{11}$, wherein voltage $V_{DS}$ has relative minima at times $t_3$, $t_5$, $t_7$, $t_9$, and $t_{11}$ and relative maxima at times $t_4$, $t_6$, $t_8$, and $t_{10}$. The drain-to-source voltage $V_{DS}$ having relative minima at times $t_3$, $t_5$, $t_7$, $t_9$, and $t_{11}$ are referred to as valleys and the time period between times $t_2$ and $t_{11}$ is referred to as a delay period. As will be discussed below, in accordance with embodiments of the present invention, the gate drive signal transitions from logic low voltage level $V_L$ to logic high voltage level $V_H$ after a last falling edge of drain-to-source voltage $V_{DS}$ that occurs during the delay period. At time $t_{11}$, the gate drive signal transitions from logic low voltage level $V_L$ to logic high voltage level $V_H$, which turns on switching transistor 12. Because converter 10 is operating in the frequency fold-back mode, power factor controller 14 delays the transition of the gate drive signal from logic low voltage level $V_L$ to logic high voltage level $V_H$ in accordance with input current $I_{IN}$ and whether drain-to-source voltage $V_{DS}$ is at a valley. Because input current $I_{IN}$ of plot 55A is lower than input current $I_{IN}$ of plot 53A shown in FIG. 6, there are more valleys in plot 55A than in plot 53A.

As discussed above, converter 10 is configured to operate in a critical conduction mode in response to current information signal $V_{FF}$ being greater than preset reference voltage $V_{REFM}$ and in a frequency fold-back mode in response to current information signal $V_{FF}$ being less than preset reference voltage $V_{REFM}$. Current information signal $V_{FF}$ is a signal that is representative of the value of input current $I_{IN}$, which is an averaged value of inductor current $I_{18A}$ over a switching period. Thus, power factor controller 14 is configured to select between the operating modes in accordance with the level of current flowing through inductor 18A and to provide a drive or control signal $V_{DR}$ to the gate of switching transistor 12, which operates as a switch. It should be noted that in response to drive signal $V_{DR}$, switching transistor 12 may be configured to be "on" or "off." In an "off" configuration switching transistor 12 operates as a switch in an open position and in an "on" configuration switching transistor 12 operates as a switch in a closed position. In response to drive signal $V_{DR}$ being at a logic high voltage level, switching transistor 12 operates as a switch in a closed configuration and in response to drive signal $V_{DR}$ being at a logic low voltage level, switching transistor 12 operates as a switch in an open configuration.

Figure 8:
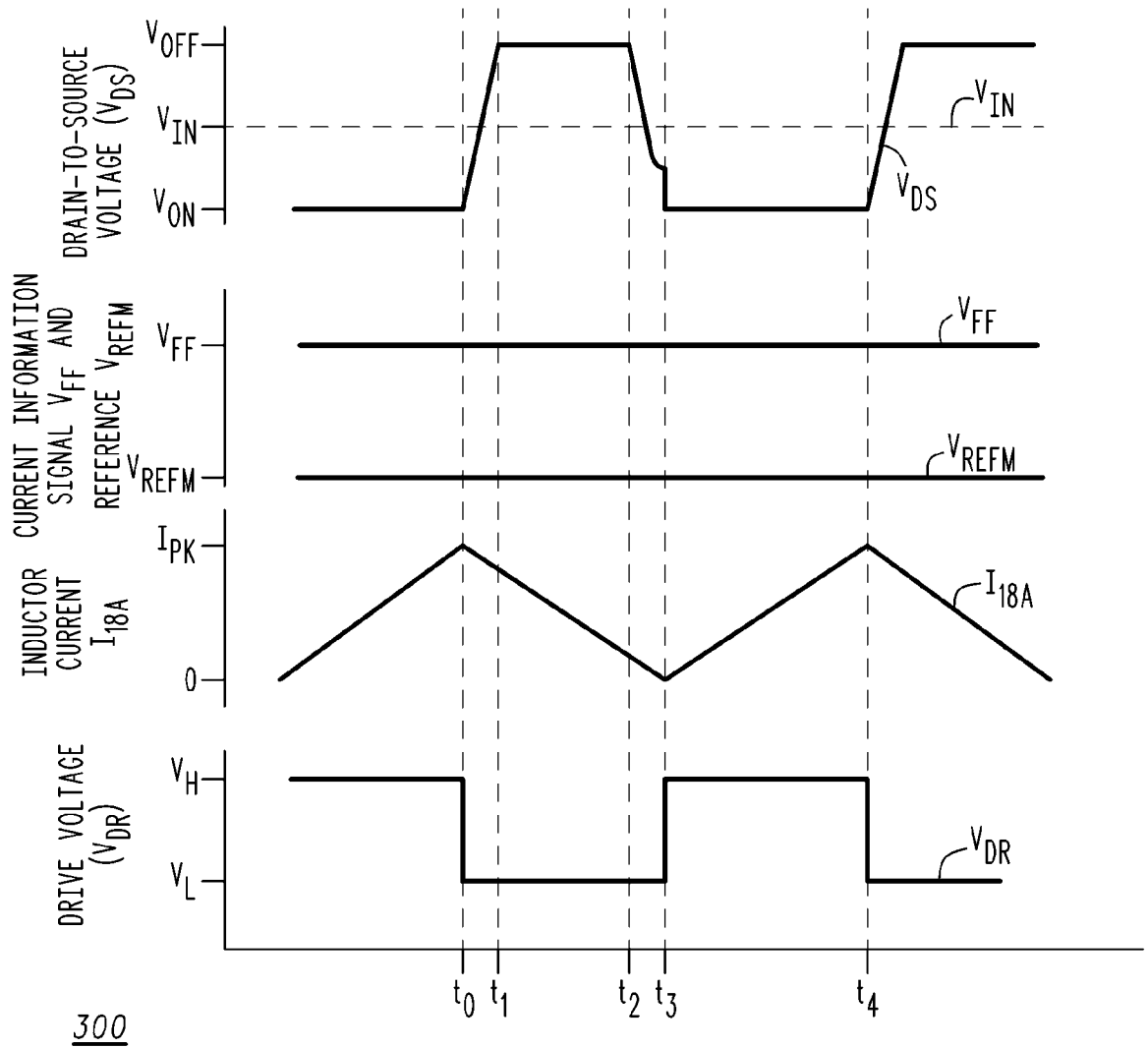
FIG. 8 is a timing diagram of circuit parameters of the converter of FIG. 1 operating in critical conduction mode in accordance with an embodiment of the present invention.

FIG. 8 is a timing diagram 300 showing signals $V_{IN}$, $V_{DS}$, $V_{FF}$, $V_{REFM}$, $I_{18A}$, and $V_{DR}$ of converter 10 operating in the critical conduction mode and is similar to FIG. 5, except that it includes a plot of inductor current $I_{18A}$, current information signal, $V_{FF}$, and preset reference voltage $V_{REFM}$. In timing diagram 300, current information signal $V_{FF}$ is higher than preset reference voltage $V_{REFM}$. Accordingly, converter 10 operates in a critical conduction mode. As discussed with reference to FIG. 5, at time $t_0$, the gate drive signal transitions from logic high voltage level $V_H$ to logic low voltage level $V_L$. In response to the gate drive signal transitioning to logic low voltage level $V_L$, drain-to-source voltage $V_{DS}$ transitions from voltage level $V_{ON}$ to voltage level $V_{OFF}$ and inductor current $I_{18A}$ begins to decrease. At time $t_0$, drive voltage $V_{DR}$ decreases from logic high voltage level $V_H$ to logic low voltage level $V_L$, which turns off switching transistor 12. In response to drive signal $V_{DR}$ changing states, drain-to-source voltage $V_{DS}$ begins to increase and inductor current $I_{18A}$ begins to decrease. At time $t_1$, drain-to-source voltage $V_{DS}$ reaches voltage level $V_{OFF}$. At time $t_2$, drain-to-source voltage $V_{DS}$ begins to decrease in response to ringing or oscillation currents due to the tank circuit formed between inductor 18A and the parasitic capacitances of converter 10. The parasitic capacitances include the sum of the capacitances attached to the drain of switching transistor 12 and the capacitances associated with the boost diode 36 of the power factor controller. At time $t_3$, the gate drive signal $V_{DR}$ transitions from logic low level $V_L$ to logic high voltage level $V_H$, which turns on switching transistor 12. In response to switching transistor 12 being on, drain-to-source voltage $V_{DS}$ transitions to voltage level $V_{ON}$. As discussed with reference to FIG. 5, converter 10 is operating in critical conduction mode, thus there is substantially zero delay (apart from the delay between times time $t_2$ and time $t_3$ that may occur while waiting for the next valley) before the gate drive signal is asserted.

It should be noted that between times $t_0$ and $t_4$, current indicator voltage $V_{FF}$ and reference voltage $V_{REFM}$ have substantially constant voltage values, where current indicator voltage $V_{FF}$ is greater or higher than preset reference voltage $V_{REFM}$. Thus in critical conduction mode operation, switching transistor 12 turns on without the introduction of a delay period in response to a first falling edge of drain-to-source voltage $V_{DS}$.

Figure 9:
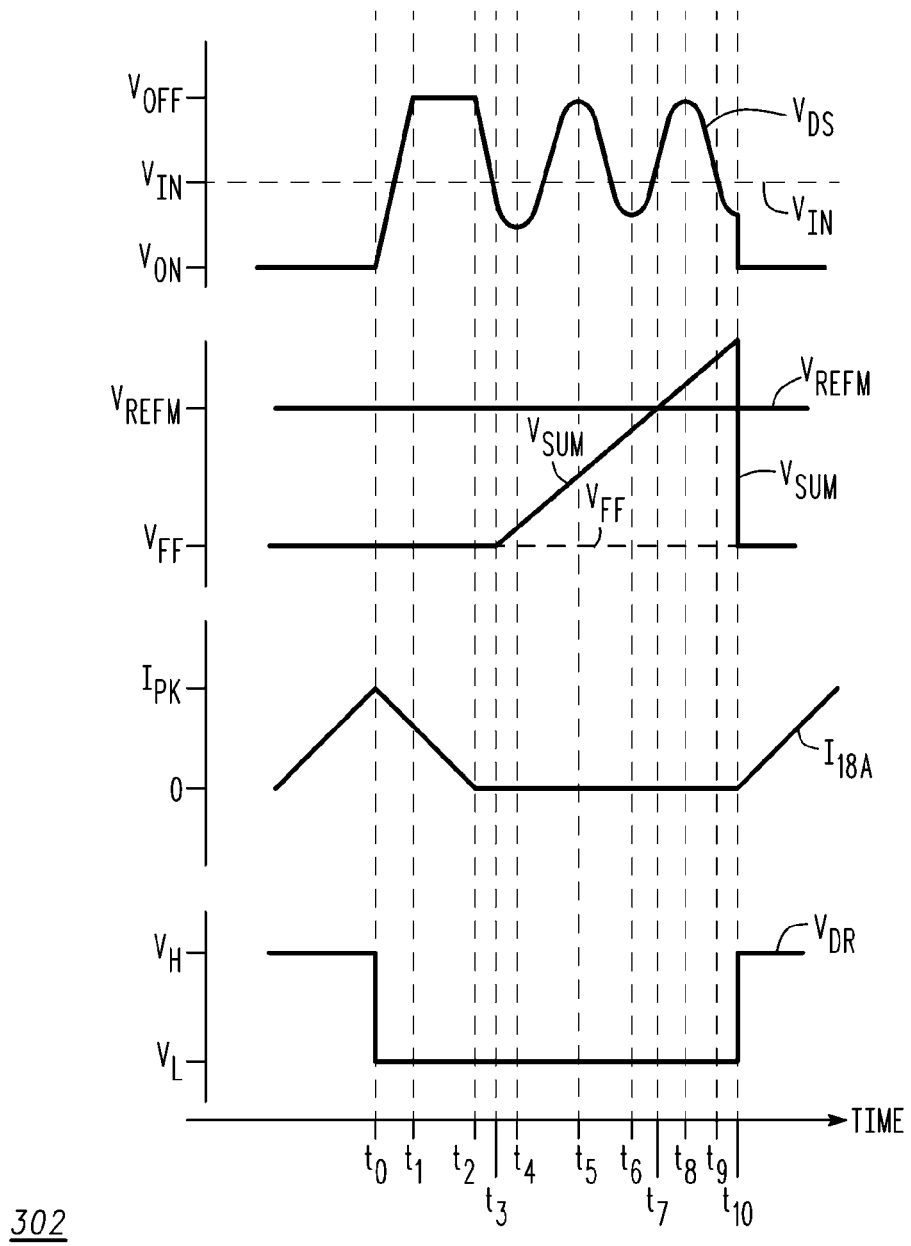
FIG. 9 is a timing diagram of circuit parameters of the converter of FIG. 1 operating in frequency fold-back mode in accordance with an embodiment of the present invention.

FIG. 9 is a timing diagram 302 showing signals $V_{IN}$, $V_{DS}$, $V_{FF}$, $V_{REFM}$, $I_{18A}$, and $V_{DR}$, and $V_{SUM}$ of converter 10 operating in the frequency fold-back mode and may include elements of FIGS. 3 and 6. In timing diagram 302, signal $V_{SUM}$, which is the sum of current information signal $V_{FF}$ and a ramp signal is less than preset reference voltage $V_{REFM}$ from time $t_0$ to time $t_7$, greater than preset reference voltage $V_{REFM}$ from time $t_7$ to time $t_{10}$, and changes to be less than preset reference voltage $V_{REFM}$ at time $t_{10}$. It should be noted that the ramp portion of signal $V_{SUM}$ is shifted by signal $V_{FF}$. Accordingly, converter 10 operates in a frequency fold-back mode. At time $t_0$, the gate drive signal transitions from logic high voltage level $V_H$ to logic low voltage level $V_L$. In response to the gate drive signal transitioning to logic low voltage level $V_L$, drain-to-source voltage $V_{DS}$ transitions from voltage level $V_{ON}$ to voltage level $V_{OFF}$. At time $t_1$, drain-to-source voltage signal $V_{DS}$ reaches voltage level $V_{OFF}$. At time $t_2$, drain-to-source voltage $V_{DS}$ begins to oscillate because of a tank circuit formed by inductor 18A and the parasitic capacitances of switching transistor 12. The drain-to-source voltage $V_{DS}$ continues to oscillate between times $t_2$ and $t_{10}$. At time $t_3$, output stage 100 generates a ramp signal that is summed with or added to current information voltage $V_{FF}$. Thus, restart signal $V_{SUM}$ increases from time $t_3$ to time $t_{10}$. At time $t_7$, restart signal $V_{SUM}$ substantially equals preset reference signal $V_{REFM}$. In response to start signal $V_{SUM}$ being substantially equal to preset reference signal $V_{REFM}$, power factor controller 14 is configured to generate a drive signal $V_{DR}$. However, power factor controller 14 includes circuitry that delays the generation of drive signal $V_{DR}$ until enabled by the first negative edge of drain-to-source voltage $V_{DS}$ that occurs after restart signal $V_{SUM}$ is greater than preset reference signal $V_{REFM}$. In the example of FIG. 9, the first negative edge of drain-to-source voltage $V_{DS}$ occurs at time $t_9$. In response to restart signal $V_{SUM}$ being greater than preset reference voltage $V_{REFM}$ and the occurrence of the negative edge of drain-to-source voltage $V_{DS}$, switching transistor 12 is turned on. Accordingly, at time $t_9$, drain-to-source voltage $V_{DS}$ decreases to voltage level $V_{ON}$ and inductor current $I_{18A}$ begins to increase. The decrease to voltage level $V_{ON}$ may be delayed to time $t_{10}$ to wait for the next valley. Thus, in the frequency fold-back mode, power factor controller 14 delays the transition of the gate drive signal from logic low voltage level $V_L$ to logic high voltage level $V_H$ in accordance with inductor current level $I_{18A}$ and an edge of drain-to-source voltage $V_{DS}$.

Figure 10:
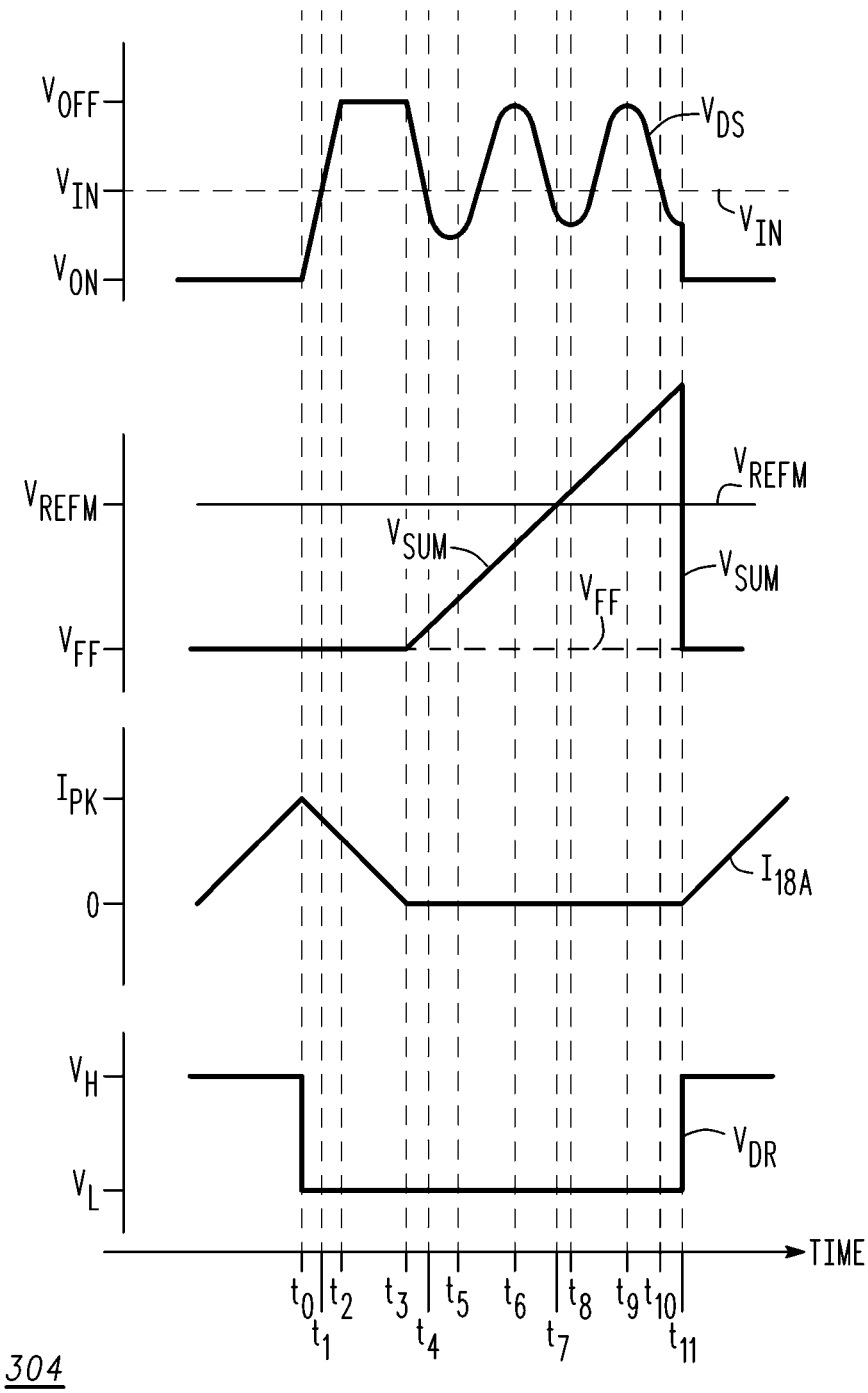
FIG. 10 is a timing diagram of circuit parameters of the converter of FIG. 1 operating in frequency fold-back mode in accordance with an embodiment of the present invention.

FIG. 10 is a timing diagram 304 showing signals $V_{IN}$, $V_{DS}$, $V_{FF}$, $V_{REFM}$, $I_{18A}$, $V_{DR}$, and $V_{SUM}$ of converter 10 operating in the frequency fold-back mode and may include elements of FIGS. 3 and 6. In timing diagram 304, current information signal $V_{SUM}$, i.e., $V_{FF}$+ramp signal, becomes greater than preset reference voltage $V_{REFM}$ from time $t_7$ to time $t_{11}$. Accordingly, converter 10 operates in a frequency fold-back mode. At time $t_0$, gate drive signal $V_{DR}$ transitions from logic high voltage level $V_H$ to logic low voltage level $V_L$. In response to the gate drive signal transitioning to logic low voltage level $V_L$, drain-to-source voltage $V_{DS}$ transitions from voltage level $V_{ON}$ to voltage level $V_{OFF}$. At time $t_2$, drain-to-source voltage signal $V_{DS}$ reaches voltage level $V_{OFF}$. At time $t_3$, drain-to-source voltage $V_{DS}$ begins to oscillate because of a tank circuit formed by inductor 18A and the parasitic capacitances attached to the drain of switching transistor 12 and the capacitance associated with diode 36. The drain-to-source voltage $V_{DS}$ continues to oscillate between times $t_3$ and $t_{11}$. At time $t_4$, output stage 100 generates a ramp signal that is summed with or added to current information voltage $V_{FF}$. Thus, restart signal $V_{SUM}$ increases from time $t_4$ to time $t_{11}$. At time $t_7$, restart signal $V_{SUM}$ substantially equals preset reference signal $V_{REFM}$. In response to start signal $V_{SUM}$ being substantially equal to preset reference signal $V_{REFM}$, power factor controller 14 is configured to generate a drive signal $V_{DR}$. However, power factor controller 14 includes circuitry that delays the generation of drive signal $V_{DR}$ until enabled by a first falling edge of drain-to-source voltage $V_{DS}$ after start signal $V_{SUM}$ is substantially equal to preset reference signal $V_{REFM}$. In the example of FIG. 10, the first negative edge of drain-to-source voltage $V_{DS}$ occurs at time $t_{10}$. In response to restart signal $V_{SUM}$ being greater than preset reference voltage $V_{REFM}$ and the occurrence of the negative edge of drain-to-source voltage $V_{DS}$, switching transistor 12 is turned on. Accordingly, at time $t_{11}$, drain-to-source voltage $V_{DS}$ decreases to voltage level $V_{ON}$ and inductor current $I_{18A}$ begins to increase. Thus, in the frequency fold-back mode, power factor controller 14 delays the transition of the gate drive signal from logic low voltage level $V_L$ to logic high voltage level $V_H$ in accordance with inductor current level $I_{184}$ and a valley of the ringing or oscillating portion of drain-to-source voltage $V_{DS}$.

It should be noted that in the example shown in FIG. 10, drain-to-source voltage $V_{DS}$ travels through a relative minima and a relative maxima after restart signal $V_{SUM}$ exceeds preset reference signal $V_{REFM}$ but before power factor controller 14 generates drive signal $V_{DR}$. However, in the example shown in FIG. 9, power factor controller 14 generates drive signal $V_{DR}$ after restart signal $V_{SUM}$ exceeds preset reference signal $V_{REFM}$ but before drain-to-source voltage $V_{DS}$ reaches its first relative minima. This occurs because power factor controller 14 is configured to generate drive signal $V_{DR}$ after restart signal $V_{SUM}$ exceeds preset reference $V_{REFM}$ and after the next valley of the ringing or oscillating portion of drain-to-source voltage $V_{DS}$. Because the next valley of the ringing or oscillating portion of drain-to-source voltage $V_{DS}$ occurs sooner in the example of FIG. 9 than FIG. 10, drive signal $V_{DR}$ is generated sooner in the example of FIG. 9 than that of FIG. 10.

Figure 11:
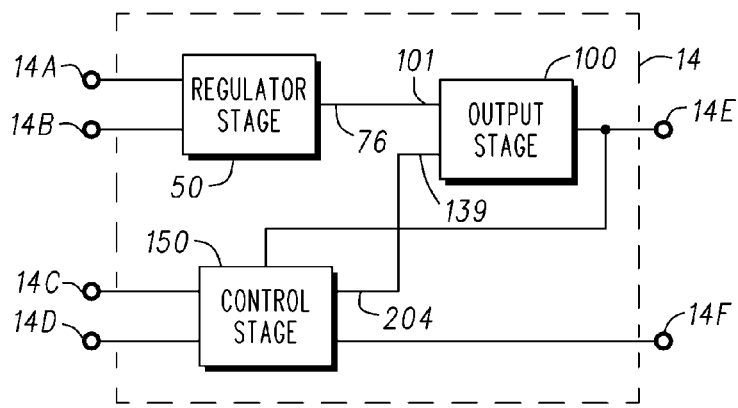
FIG. 11 is a circuit schematic of the power factor controller of FIG. 1 in accordance with an embodiment of the present invention.

FIG. 11 is a block diagram of power factor controller 14 in accordance with an embodiment of the present invention. What is shown in FIG. 11 is a regulator stage 50 and a control stage 150 connected to an output stage 100. It should be noted that regulator stage 50, control stage 150, and output stage 100 may be monolithically integrated together in a semiconductor material to form power factor controller 14. An input of regulator stage 50 is configured to serve as an input terminal 14A of power factor controller 14 and another input of regulator stage 50 is configured to serve as input/output terminal 14B of power factor controller 14; an input of control stage 150 is configured to serve as input terminal 14C of power factor controller 14 and another input of control stage 150 is configured to serve as input/output terminal 14D of power factor controller 14; an output of output stage 150 is configured to serve as output terminal 14E of power factor controller 14; and an input of control stage 150 is configured to serve as input terminal 14F of power factor controller 14.

Figure 12:
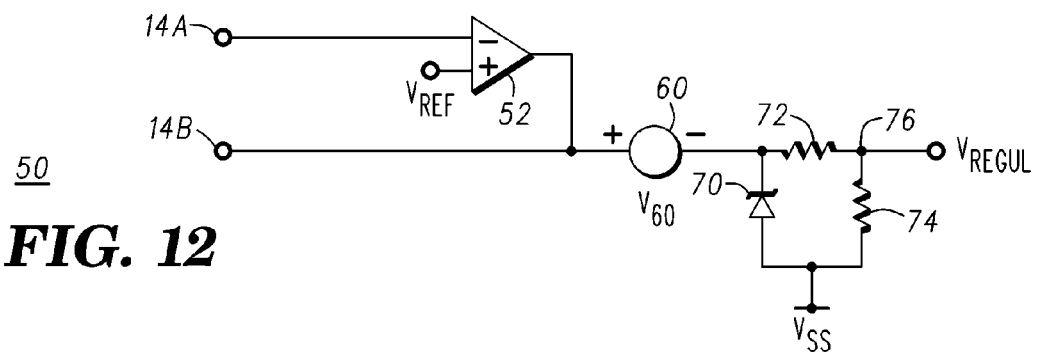
FIG. 12 is a circuit schematic of a regulator stage of the power factor controller of FIG. 11 in accordance with an embodiment of the present invention.

FIG. 12 is a circuit schematic of regulator stage 50 in accordance with an embodiment of the present invention. Regulator stage 50 includes an operational transconductance amplifier 52 having an inverting input, a noninverting input, and an output. Operational transconductance amplifier 52 is also referred to as an error amplifier. The output of error amplifier 52 is connected to a terminal of an offset voltage source 60, which connection serves as or is connected to input/output terminal 14B of power factor controller 14. Regulator stage 50 further includes a Zener diode 70 coupled to input terminal 14B through offset voltage source 60. A resistor 72 has a terminal connected to the cathode of Zener diode 70 and a terminal connected to a terminal of a resistor 74. The other terminal of resistor 74 is coupled for receiving source of operating potential $V_{SS}$. The terminals of resistors 72 and 74 that are connected together serve as an output 76 at which regulated voltage $V_{REGUL}$ is formed.

Figure 13:
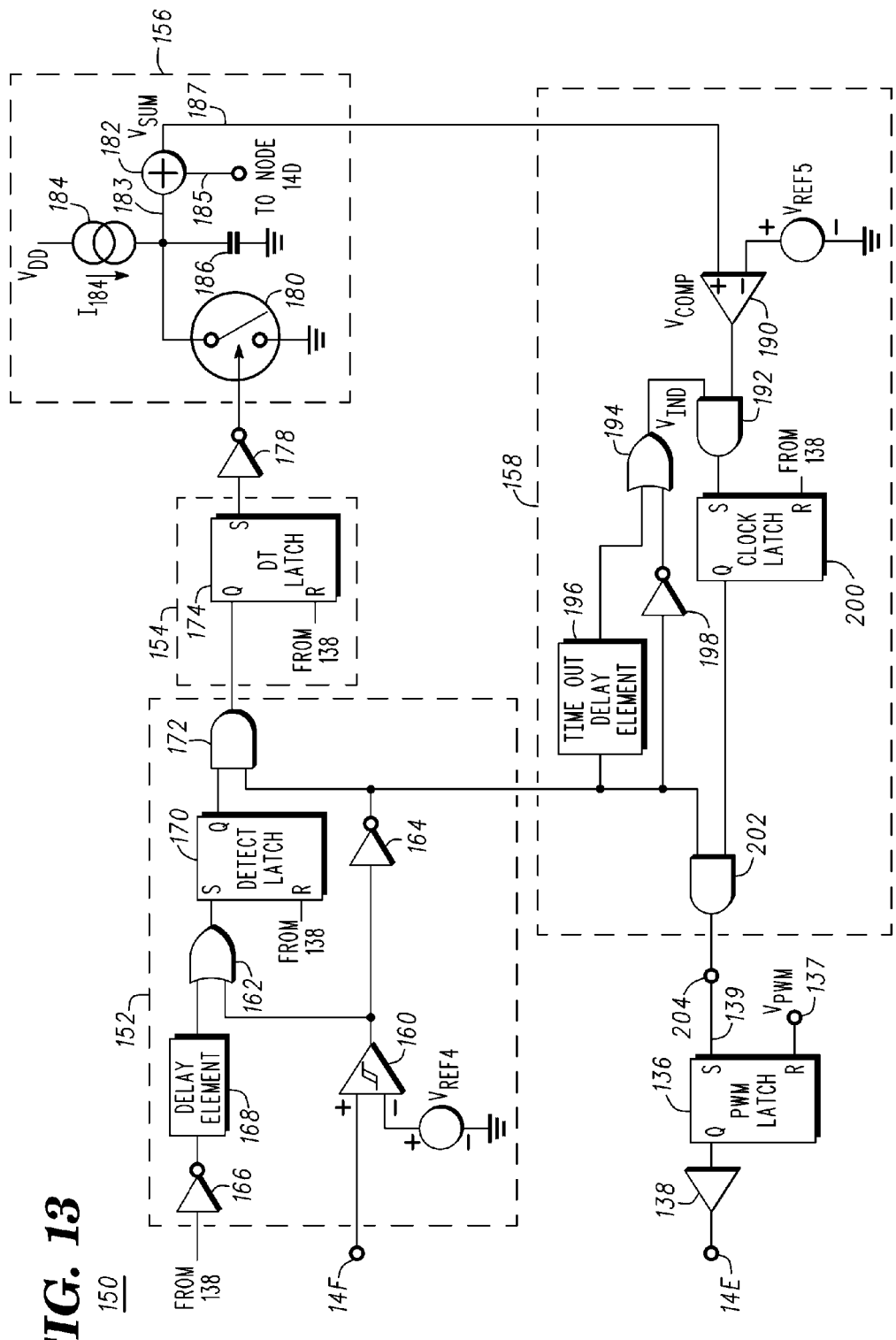
FIG. 13 is a circuit schematic of a control stage of the power factor controller of FIG. 11 in accordance with an embodiment of the present invention.

FIG. 13 is a circuit schematic of control stage 150 in accordance with an embodiment of the present invention. Control stage 150 may be comprised of an input substage 152 coupled to a dead-time end control substage 156 through a detection substage 154. Input substage 152 may be referred to as a zero current detection stage and detection stage 154 may be referred to as a dead time detection stage. A clock generation or synchronization stage 158 is connected to input substage 152 and ramp substage 156. Input substage 152 comprises a comparator 160 having a noninverting input, an inverting input, and an output. The noninverting input may serve as input terminal 14F of power factor controller 14 and the inverting input may be coupled to a reference voltage $V_{REF4}$. It should be noted that comparator 160 has hysteresis. The output of comparator 160 is commonly connected to an input of a two-input OR gate 162 and to an input of an inverter 164. Input substage 152 further includes an inverter 166 having an output coupled to the input of a delay element 168. The output of delay element 168 is connected to the other input of two-input OR gate 162. A detect latch 170 has an input coupled to the output of two-input OR gate 162. Detect latch 170 and inverter 166 each have an input configured to receive the driver signal from the output of driver 138. The output of detect latch 170 is connected to an input of a two-input AND gate 172 and the output of inverter 164 is connected to the other input of two-input AND gate 172. The output of two-input AND gate 172 serves as the output of input substage 152.

Detection stage 154 may be comprised of a dead-time (DT) detection latch 174 having an input connected to the output of input substage 152, i.e., the output of two-input AND gate 172, and an input configured to receive the driver signal from the output of driver 138, and an output that serves as the output of detection stage 154.

Ramp substage 156 comprises a switch 180 having a current carrying electrode commonly connected to an input of a summer 182, a current source 184 having a terminal coupled for receiving a source of operating potential such as, for example, $V_{DD}$, and a current carrying terminal of a capacitor 186. Switch 180 and capacitor 186 each have a current carrying terminal coupled for receiving a source of operating potential such as, for example, $V_{SS}$. In addition, switch 180 has a control electrode coupled to the output of detection stage 154 through an inverter 178. Summer 182 has an input 183 coupled to capacitor 186, an input 185 configured to receive a signal from input/output terminal 14D of power factor controller 14, and an output 187 that serves as an output of ramp substage 156.

Clock generation stage 158 comprises a comparator 190 having an inverting input coupled to the output of ramp substage 156, a noninverting input coupled for receiving a reference signal $V_{REF5}$, and an output coupled to an input of a two-input AND gate 192. The other input of two-input AND gate 192 is connected to an output of a two-input OR gate 194. The inputs of two-input OR gate 194 are configured to receive a signal from inverter 164 of input substage 152. For example, the output of inverter 164 may be coupled to an input of two-input OR gate 194 through a delay element 196 and to the other input of two-input OR gate 194 through an inverter 198. The output of AND gate 192 is coupled to an input of a two input AND gate 202 through a clocking latch 200. For example, the output of AND gate 192 may be connected to the set input of PWM latch 200 and the reset input of PWM latch 200 may be connected to the output of buffer circuit 138, i.e., to output terminal 14E. One input of two-input AND gate 202 may be commonly connected to the output of inverter 164 and an input of two-input AND gate 172 of input substage 152 and the other input may be connected to the output of clocking latch 200. The output 204 of AND gate 202 serves as the output of clock generation stage 158 and is connected to input 139 of a PWM latch 136.

PWM latch 136 has an input 137 coupled for receiving a PWM signal and an input 139 connected to output terminal 204 of output stage 150. The output of PWM latch 136 is connected to output 14E of power factor controller 14 through a buffer circuit 138.

Figure 14:
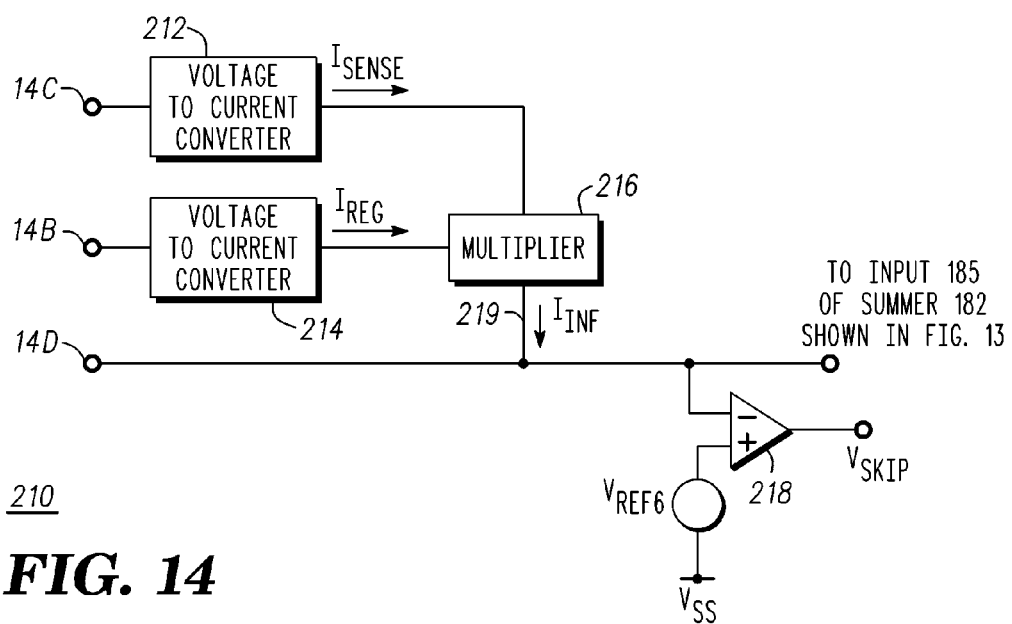
FIG. 14 is a circuit schematic of a current information generation stage of the power factor controller of FIG. 11 in accordance with an embodiment of the present invention.

FIG. 14 is a circuit schematic of a current information generation stage 210 in accordance with an embodiment of the present invention. Current information generation stage 210 may be a portion of control stage 150. Current information generation stage 210 may include a voltage-to-current converter 212 having an input that serves as or may be connected to input terminal 14C of power factor controller 14 and an output connected to an input of a multiplier circuit 216. Current information generation stage 210 further includes a voltage-to-converter 214 that has an input that serves as or may be connected to input/output terminal 14B of power factor controller 14 and an output connected to another input of multiplier circuit 216. Multiplier circuit 216 has an output 219 connected to the inverting input of a comparator 218. The output of multiplier 216 is configured to serve as input/output terminal 14D of power factor controller 14. Comparator 218 has a noninverting input coupled for receiving a reference voltage $V_{REF6}$ and an output configured for transmitting a signal $V_{SKIP}$. Input/output terminal 14D is connected to input 185 of summer 182 illustrated in FIG. 14.

Referring again to FIGS. 11-14, generation of the dead-time by power factor controller 14 will now be described. As discussed above, power factor controller 14 operates in a critical conduction mode in response to current indicator reference signal $V_{FF}$ exceeding a preset reference voltage $V_{REFM}$. Current indicator reference signal $V_{FF}$ is a voltage representation of the level of input current $I_{IN}$. In response to input current $I_{IN}$ being low, power factor controller 14 introduces a dead time in inductor current $I_{18A}$ to reduce the switching frequency of switching transistor 12 (shown in FIG. 1). In accordance with an embodiment, power factor controller 14 linearly reduces the switching frequency of switching transistor 12. Current indicator signal $V_{FF}$ is generated by connecting a resistor 34 between input/output terminal 14D (shown in FIGS. 1, 11, and 14) of power factor controller 14 and a source of operating potential such as, for example, voltage $V_{SS}$. FIGS. 1 and 11 provide a block configuration of power factor controller 14, whereas FIG. 14 provides a more detailed configuration of the circuitry coupled to input/output terminal 14D.

As discussed above, FIG. 14 is a circuit schematic of a current information generation stage 210, which is configured to generate current indicator reference signal $V_{FF}$. In operation, power factor controller 14 is configured to generate a sense voltage $V_{SENSE}$ at input pin 14C. More particularly, input pin 14C is coupled for receiving a portion of the instantaneous input voltage signal $V_{IN}$ through voltage divider network 15 (shown in FIG. 1). It should be noted that voltage $V_{SENSE}$ (shown in FIG. 1) may be used to detect brown-out conditions and the line range. Voltage-to-current converter 212 converts voltage sense signal $V_{SENSE}$ into a current $I_{SENSE}$, which is transmitted to a current multiplier circuit 216. In addition, power factor controller 14 is configured to generate a regulation voltage at pin 14B and to use a voltage-to-current converter 214 to generate a regulation current $I_{REG}$, which is transmitted to current multiplier 216. Multiplier circuit 216 multiplies sense current $I_{SENSE}$ by regulator current $I_{REG}$ and a multiplier gain $K_m$ to generate a current signal $I_{INF}$ that is representative of the input current $I_{IN}$. It should be noted that the output signal of multiplier circuit 216 is proportional to a rectified sinusoid whose magnitude is proportional to the power as provided by regulated voltage $V_{REGUL}$, where the rectified sinusoidal shape is provided by voltage sense signal $V_{SENSE}$. It should be further noted that output voltage $V_{REGUL}$ is an output signal of a regulation block, wherein the regulation block regulates the output voltage to a desired level. Current $I_{INF}$ flows through resistor 34 (shown in FIG. 1) to generate current indicator reference signal $V_{FF}$. Input 185 is an input to summer 182 (shown in FIG. 13) and is therefore a high impedance input. Accordingly, current $I_{INF}$ flows through resistor 34 that is coupled to input pin 14D and generates current indicator reference signal $V_{FF}$. Current indicator signal $V_{FF}$ may be referred to as a content signal. Current indicator reference signal $V_{FF}$ may be derived using a signal representative of the power derived from an output signal of regulation block 50 multiplied by a signal representative of the input voltage, wherein regulation block 50 regulates the output voltage to a desired level. It should be understood that current indicator reference signal $V_{FF}$ can be derived from a signal representative of the power.

Power factor controller 14 includes a regulation block or regulator stage 50 illustrated in FIGS. 11 and 12 that is configured to receive a feedback signal $v_{FEED}$ at input pin 14A and to generate a control signal $v_{CTRL}$ at input pin 14B. By way of example, feedback signal $v_{FEED}$ is a portion of a power factor correction output signal. Referring to FIG. 12, the output of operational transconductance amplifier 52 is connected to input pin 14B to provide external loop compensation. Control signal $v_{CTRL}$ is offset by offset voltage $v_{60}$ of voltage source 60 and reduced by Zener diode 70 and the resistor network comprising resistors 72 and 74 to generate a regulated voltage $v_{REGUL}$ at node 76.

Referring to FIG. 13, a schematic diagram of control stage 150 is illustrated and has been described above. Control stage 150, also referred to as a dead-time detection stage, is configured to generate a clock signal $V_{CLK}$ which is coupled to output stage 100. In operation and referring to FIGS. 1 and 13, a current detection circuit 19 comprising secondary winding or inductor 18B, diode 26, and resistors 28 and 30 are coupled to input pin 14F. Input pin 14F serves as an input pin for zero current detection stage 152 and generates a signal at the output of AND gate 172 in response to detecting current $I_{IN}$ being at a zero level. In accordance with embodiments of the present invention, zero current detection stage 152 detects when the first valley of drain-to-source voltage $V_{DS}$ changes voltage. Reaching the first valley of the drain-to-source voltage $V_{DS}$ may be referred to as reaching dead time. In response to reaching the first valley, AND gate 172 generates an output signal that sets latch 174 of dead-time detection stage 154.

Dead-time detection stage 154 generates an output signal that may be inverted and serves as a control signal for switch 180. In response to being in the dead-time, the control signal from inverter 178 turns off or opens switch 180 and current source 184 sources a current $I_{184}$ that charges capacitor 186. In response to being charged, capacitor 186 generates a ramp signal that is transmitted to input 183 of adder 182. Adder 182 may be referred to as an adder circuit, a summer, a summer circuit, a summing circuit, etc. In addition, current indicator reference signal $V_{FF}$ from input pin 14D (shown in FIGS. 1 and 11) is transmitted to input 185 of adder 182 (shown in FIG. 13). In response to the signals appearing at inputs 183 and 185, summer 182 generates a dead-time control signal $V_{SUM}$ at output 187. Dead-time control signal $V_{SUM}$ may also be referred to as a restart signal.

In response to dead-time control signal $V_{SUM}$ exceeding reference voltage $V_{REF5}$, comparator 190 generates a comparison signal $V_{COMP}$ that can be used to turn on switching transistor 12.

In accordance with another embodiment of the present invention, the turn on of switching transistor 12 is synchronized with the ringing that appears on drain-to-source voltage $V_{DS}$. Synchronization may be accomplished in response to logically ANDing comparison signal $V_{COMP}$ with an indicator signal $V_{IND}$ which indicates that drain-to-source voltage $V_{DS}$ is high. It should be noted that indicator signal $V_{IND}$ is generated in response to signals transmitted from zero current detection input pin 14F through comparator 160, inverters 164 and 198, time delay element 196, and OR gate 194 to an input of AND gate 192. Accordingly, clock generation stage 158 uses comparison signal $V_{COMP}$ and indicator signal $V_{IND}$ to set latch 200. In response to being set, latch 200 generates a signal in a high state at its output Q. It should be noted that latch 200 will be reset by drive signal $V_{DR}$. Thus clock signal $V_{CLK}$ is generated in response to latch 200 being in the high state and the drain-to-source voltage $V_{DS}$ being at a subsequent valley, i.e., the second, third, fourth, etc. valley. It should be noted that delay element 196 is included in case the ringing on the drain-to-source voltage $V_{DS}$ is sufficiently damped that the valleys in the ringing are insufficient to be detectable.

By now it should be appreciated that a converter that includes a power factor controller and a method for operating the converter have been provided. In accordance with embodiments, the converter uses current controlled frequency foldback, wherein the converter operates in critical conduction mode in response to a current information signal being greater than a preset reference signal and in a frequency fold-back mode in response to the current information signal being less than the preset reference signal. In the frequency foldback mode, a current information signal representative of an input current, which is an averaged value of inductor current $I_{18A}$ over a switching period, and independent of a peak input current is created and used to generate a dead-time in the inductor current and thus reduce the switching period. The peak input current can be adjusted without affecting the signal that is representative of the input current and hence without affecting the dead-time. The converter is configured to generate a drive signal in response to the sum of the current information signal and a ramp signal equaling or exceeding the preset reference signal. Generation of the drive signal may be synchronized to a valley of a drain-to-source voltage $V_{DS}$. Thus, the dead-time can be synchronized to the drain-to-source voltage $V_{DS}$ ringing without the occurrence of oscillations between one or more valleys, i.e., without valley jumping. It should be noted that generation of the drive signal may set the duration of the dead-time. The duration of the dead-time may be set in response to a difference between preset reference voltage $V_{REFM}$ and a sum $V_{SUM}$ of a level of the information signal $V_{FF}$ and a ramp signal.

Although specific embodiments have been disclosed herein, it is not intended that the invention be limited to the disclosed embodiments. For example, embodiments for a power factor correction circuit have been described. However, configurations that include other types of converters such as, for example, flyback or forward converters are intended to be included within the scope of the claims. It should be noted than in flyback and forward converters, the operating mode in which a new current cycle occurs in response to the magnetic component being demagnetized is generally referred to as quasi-resonant mode instead of a critical conduction mode. Those skilled in the art will recognize that modifications and variations can be made without departing from the spirit of the invention. It is intended that the invention encompass all such modifications and variations as fall within the scope of the appended claims.

What is claimed is:

1. A method for regulating an output voltage, comprising:
   generating an input current that flows through a first inductor in response to a load condition on a converter and a switching activity of a switching device;
   generating a current indicator signal that is a representation of a level of the input current;
   limiting a switching frequency of the switching device in response to the current indicator signal and to a sense signal generated in response to an input voltage signal;
   operating the converter in a critical conduction mode in response to the current indicator signal being greater than a first reference voltage, wherein in the critical conduction mode the input current increases from a first level to a second level over a first period of time, decreases from the second level to the first level over a second period of time, increases from the first level to the second level over a third period of time, and decreases from the second level to the first level over a fourth period of time;
   operating the converter in a frequency fold-back mode in response to the current indicator signal being less than the first reference voltage, wherein in the frequency fold-back mode the input current increases from a third level to a fourth level over a fifth period of time in response to the controller generating a drive signal and the switching device being on, the input current decreases from the fourth level to the third level over a sixth period of time in response to the controller generating the drive signal that turns off the switching device, the input current remains at the third level over a seventh period of time in response to the controller generating the drive signal that leaves the switching device off, and the input current increases from the third level to the fourth level over an eighth period of time in response to the controller generating the drive signal that turns on the switching device.

2. The method of claim 1, further including operating the converter in a critical conduction mode in response to the current indicator signal being greater than the first reference voltage.

3. The method of claim 2, further including generating a dead-time in an inductor current in response to the current indicator signal being lower than the first reference voltage.

4. The method of claim 1, further including reducing the switching frequency of the switching device in response to the current indicator signal being less than the preset reference voltage.

5. The method of claim 1, further including generating a dead-time in an inductor current in response to the current indicator signal being less than the first reference voltage.

6. The method of claim 1, further including increasing a dead-time in an inductor current in response to decreasing the current indicator signal.

7. The method of claim 1, further including setting a duration of the dead-time in response to a difference between the first reference voltage and a sum of a level of the current indicator signal and a ramp signal.

8. The method of claim 7, wherein the switching device comprises a power switch having a control electrode and first and second current carrying electrodes, and wherein setting the duration of the dead-time further includes synchronizing the duration to a signal at the first current carrying electrode of the power switch.

9. The method of claim 1, further including providing a second reference voltage, the first reference voltage greater than the second reference voltage, and skipping cycles of the current from the input of the power factor correction converter in response to the current indicator signal being less than the second reference voltage.

10. The method of claim 1, further including providing a power factor controller wherein providing the power factor controller comprises:
providing a regulator stage having first and second inputs and an output;
providing a control stage having first and second inputs and an output, the first output configured to convert a first signal into a content signal that carries information about the first signal; and
providing an output stage having first and second inputs and an output, the first input coupled to the output of the regulator stage and the second input coupled to the output of the control stage.

11. The method of claim 10, wherein providing the control stage comprises:
providing an input stage having first and second inputs and first and second outputs;
providing a dead-time detection circuit having an input and an output, the input of the dead-time detection circuit coupled to the first output of the input stage;
providing a summer stage having first and second inputs and an output, the first input coupled to the output of the dead-time detection circuit; and
providing a clock generation circuit having an input and an output, the input coupled to the output of the summer stage.

12. The method of claim 10, wherein providing the summer stage comprises:
providing a summer circuit having first and second inputs and an output, the output serving as the output of the summer stage;
providing a capacitor having a terminal coupled to the first input of the summer circuit;
providing a charging device coupled to the terminal of the capacitor and to the first input of the summer circuit; and
providing a switch having a first terminal and a control terminal, the control terminal coupled to the output of the dead-time detection circuit and the first terminal coupled to the terminal of the capacitor, the charging device, and the first input of the summer circuit.

13. The method of claim 10, wherein the providing the output stage comprises:
providing a latch having first and second inputs and an output, the first input of the latch coupled to the output of the clock generation circuit; and
providing a comparator having first and second inputs and an output, the output coupled to the second input of the latch, the first input coupled to a ramp generation circuit, and the second input coupled to the output of the regulator stage.

14. The method of claim 10, wherein providing the power factor controller further comprises:
providing a first voltage to current converter having an input and an output;
providing a second voltage to current converter having an input and an output;
providing a multiplier circuit having first and second inputs, a control input, and an output, the first input coupled to the output of the first voltage to current converter, the second input coupled to the output of the second voltage to current converter, and the output coupled to the first input of the control stage and to the second input of the summer circuit.

* * * * *